UNITED STATES PATENT OFFICE.

JOHN WINSLOW JONES, OF DEERING, MAINE, ASSIGNEE, BY MESNE ASSIGNMENTS, OF ISAAC WINSLOW, DECEASED.

IMPROVEMENT IN INDIAN CORN PRESERVED GREEN.

Specification forming part of Letters Patent No. 34,928, dated April 8, 1862; reissue No. 7,067, dated April 18, 1876; application filed March 2, 1876.

*To all whom it may concern:*

Be it known that ISAAC WINSLOW, late of Philadelphia, in the county of Philadelphia and State of Pennsylvania, deceased, did, in his lifetime, invent a certain new and useful Improvement in the Art of Preserving Indian Corn in its Green or Unripe State; and I do hereby declare that the following is a full, clear, and exact description and specification of said invention, sufficient to enable any person skilled in the art to practice the same.

It is well known that the mere preservation of unripe Indian corn or maize for subsequent use as an article of food may be effected in various ways—as, for example, by desiccation, or by first boiling the green corn and afterward drying it; and it has long been known that by the Appert process, patented in England by Durand in the year 1810, various articles of food, both animal and vegetable, have been effectually preserved for many years by boiling them in hermetically-sealed bottles, or by boiling them in open bottles and afterward hermetically sealing the bottles. The two first-mentioned processes, however, produce a hard, insipid article, so slightly resembling fresh green corn as to be of little practical value, and the Appert process, so far as is known, has never been successfully applied to green corn, nor indeed can it be so applied, from the information to be derived from the Durand patent, and without further experiment and discovery. The said ISAAC WINSLOW, in his lifetime, invented and discovered an improvement upon the said Appert process, which enabled said process to be successfully applied to the preservation of green corn as an article of food, and whereby a new and greatly-improved article of food is produced—to wit, an article composed essentially of the kernels of green corn divested of the inner ends and harder portions of the hulls, and boiled in their own juices in cans substantially closed, to prevent the escape of the aroma, as will be hereinafter described.

So far as said Winslow's invention related to the same, being fully described and claimed in a separate patent therefor, it is not herein claimed; but the invention which forms the subject-matter of the present application consists in the improved product or article of manufacture.

The corn is to be taken when too green and tender to be capable of shelling from the ear, at which time the hull or integument of the kernel is filled with a rich milky fluid, containing in solution or in liquid form the more palatable and nutritious qualities of the corn. It is then to be cut or scraped from the cob in such a manner as not to detach and remove the inner ends of the kernels, consisting of hard woody parts of the integument, with the points by which they are attached to the cob, but to obtain for use only the outer ends of the kernels, with the juices and softer portions of the corn, and to break the integument and allow the contained liquids to flow out and envelop and permeate the mass thus removed from the ear, for the purpose of furnishing a liquid in which it may be cooked. The best mode of accomplishing such removal is by means of a curved gaged knife, so adjusted or operated as to cut the kernels about in the middle or at the outer surface of the cob, removing all the portions of the corn outside of the track of the knife, and leaving the inner portions still adherent to the cob, after which the pith, juice, and heart of such inner portions can be scraped from the cob with the back of the knife, or by other suitable means. The means by which the proper removal of the corn is effected are not essential; but the removal of the corn in such manner as to break the integuments of the kernels, and to separate the softer portions and outer ends from the hard woody points, is essential, as otherwise the resulting product is of very little practical value for food. After having thus removed from the cob the portion of the corn to be preserved, if it be found that the corn has been allowed to become a little too old and hard, so that its natural juices will not furnish sufficient fluid in which to properly cook it, a little sugar and water may be added; but this should be provided against as far as possible, inasmuch as the essential feature of the process, as distinguished from previously-known processes, consists in properly separating and obtaining the right parts of the kernels, and then cooking them wholly or mainly in their own juices, which imparts a distinct character and peculiar value to the resulting product. The materials for preservation having been thus carefully prepared, they are to be placed in strong cans, which are to be hermetically sealed, or practically closed, so as to prevent the boiling away of the liquids and the escape of the aroma. The cans are then to be boiled or steamed until the material within is thoroughly cooked. The time necessary for this purpose varies somewhat with the temperature at which they are boiled, or to which they are subjected, about four hours being necessary when boiled in fresh water not under pressure, and a proportionately less time being required when boiled in such other manner that the contents of the cans are subjected to a greater heat than 212° Fahrenheit.

The cans should be very strong to prevent their bursting by heat. I have sometimes practiced puncturing them after they were well heated—say for ten minutes. This allows the air to escape, when I immediately reseal them, to prevent the evaporation of the juices or the loss of the natural aroma. The puncturing of the cans is no part of the process, but is merely to prevent their possible bursting, and to allow their heads to press inward when cool, so that dealers can see by their outward appearance that the corn is perfectly preserved. The article of food thus produced and preserved for future use is even more palatable and wholesome than the fresh boiled corn, and will keep indefinitely in any climate.

I claim as the invention of said ISAAC WINSLOW—

The improved article herein described, consisting essentially of the softer and more edible parts of green Indian corn, separated from the harder and more woody parts, boiled in a liquid consisting wholly or mainly of its own juices, and packed in air-tight cans, substantially as described.

JOHN WINSLOW JONES.

Witnesses:
EDWARD MOORE,
HENRY H. BURTON.